United States Patent
Kakinami et al.

(10) Patent No.: US 7,727,112 B2
(45) Date of Patent: Jun. 1, 2010

(54) CONTROL SYSTEM FOR POWER TRANSMISSION UNIT OF VEHICLE

(75) Inventors: Takuma Kakinami, Toyota (JP); Yuji Iwase, Mishima (JP); Atsushi Tabata, Okazaki (JP); Tooru Matsubara, Toyota (JP); Hiroyuki Shibata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 606 days.

(21) Appl. No.: 11/679,552

(22) Filed: Feb. 27, 2007

(65) Prior Publication Data

US 2007/0202987 A1 Aug. 30, 2007

(30) Foreign Application Priority Data

Feb. 28, 2006 (JP) ............................. 2006-053622

(51) Int. Cl.
*B60W 10/02* (2006.01)
*B60W 10/10* (2006.01)

(52) U.S. Cl. ....................................................... 477/79
(58) Field of Classification Search ..................... 477/6, 477/73, 75, 83
See application file for complete search history.

(56) References Cited

U.S. PATENT DOCUMENTS

| | | | |
|---|---|---|---|
| 5,101,786 A | 4/1992 | Kamio et al. | |
| 7,207,919 B2 | 4/2007 | Tsuneyoshi et al. | |
| 2003/0078134 A1 | 4/2003 | Kojima et al. | |
| 2005/0189192 A1* | 9/2005 | Serebrennikov | 192/30 V |
| 2005/0209760 A1* | 9/2005 | Tabata et al. | 701/53 |

FOREIGN PATENT DOCUMENTS

| | | |
|---|---|---|
| JP | 62-124355 | 6/1987 |
| JP | 3-277863 | 12/1991 |
| JP | 2002-78110 | 3/2002 |
| JP | 2003-127681 | 5/2003 |
| JP | 2005-256883 | 9/2005 |
| JP | 2005-256941 | 9/2005 |
| JP | 2005-264762 | 9/2005 |

* cited by examiner

*Primary Examiner*—Sherry L Estremsky
*Assistant Examiner*—Edwin A. Young
(74) *Attorney, Agent, or Firm*—Oblon, Spivak, McClelland, Maier & Neustadt, L.L.P.

(57) ABSTRACT

A control system for a power transmission unit of a vehicle transmitting power outputted from a prime mover is disclosed. The control system includes a resonance detecting/predicting device which detects or predicts a generation of a resonance of the power transmission unit resulting from a power transmission; a driving condition detecting device which detects a driving condition of a vehicle in case the generation of a resonance is detected or predicted by the resonance detecting/predicting device; and a resonance dampening control selecting device which selects a control for dampening the detected or predicted resonance on the basis of the driving condition of the vehicle detected by the driving condition detecting device.

37 Claims, 11 Drawing Sheets

FIG.4

|     | C0 | C1 | C2 | B0 | B1 | B2 | B3 |
|-----|----|----|----|----|----|----|----|
| 1st | ◎ | ○ |   |   |   |   | ○ |
| 2nd | ◎ | ○ |   |   |   | ○ |   |
| 3rd | ◎ | ○ |   |   | ○ |   |   |
| 4th | ◎ | ○ | ○ |   |   |   |   |
| 5th |   | ○ | ○ | ◎ |   |   |   |
| R   |   |   | ○ |   |   |   | ○ |
| N   |   |   |   |   |   |   |   |

○ ENGAGED  
◎ ENGAGED AT GEARED SPEED CHANGE, RELEASED AT CONTINUOUSLY VARIABLE SPEED CHANGE

CONTROL SYSTEM FOR POWER TRANSMISSION UNIT OF VEHICLE

BACKGROUND OF THE INVENTION

1. Field of the Invention

This invention relates generally to a system for controlling a power transmitting condition of a power transmission unit mounted on a vehicle, and more particularly, to a control system for dampening a resonance resulting from a transmission of power.

The disclosure of Japanese Patent Application No. 2006-053622 filed on Feb. 28, 2006 including specification, drawings and claims is incorporated herein by reference in its entirety.

2. Related Art

An internal combustion engine such as a gasoline engine is conventionally used as a prime mover of a vehicle, and a power transmission system for transmitting a power to a driving wheel is composed mainly of a speed change mechanism. As a speed change mechanism, a geared transmission varying a speed change ratio stepwise, and a continuously variable transmission varying a speed change ratio continuously are widely known. Additionally, in recent years, an apparatus, in which a speed change ratio is substantially varied by changing a distribution rate of a power distributed from an internal combustion engine to a motor generator and to an output side through a differential mechanism, has been come into practical use. One example of apparatus of this kind is disclosed in Japanese Patent Laid-Open No. 2003-127681. According to a drive unit for hybrid vehicles suggested by Japanese Patent Laid-Open No. 2003-127681, an internal combustion engine is connected to a carrier of a planetary gear mechanism, a first motor generator is connected to a sun gear of the planetary gear mechanism, and a ring gear is connected to a member of an input side of an automatic geared transmission. The member of the input side of the automatic transmission is connected to a propeller shaft, and a second motor generator is connected to the propeller shaft. Thus, according to this drive unit for hybrid vehicles, the planetary gear mechanism functions as a distribution mechanism distributing a power of an engine to the first motor generator and to the transmission.

In case the vehicle is driven by the power of the aforementioned internal combustion engine, a revolution frequency of the internal combustion engine can be set to a value for a preferable fuel economy by using the first motor generator as a generator and controlling the speed thereof. An electric power generated by the first motor generator is fed to the second motor generator so as to operate the second motor generator as a motor. The driving force generated by the second motor generator is applied to the member of the output side, and surplus electricity is stored in an accumulator device. In case the vehicle decelerates, the second motor generator is used as a generator to regenerate energy. In case the vehicle is driven only by the electric power, the vehicle is driven by the power of the second motor generator by feeding the electric power to the second motor generator from the accumulator device. According to the apparatus suggested by Japanese Patent Laid-Open No. 2003-127681, additionally, the speed change ratio of the distribution mechanism is varied continuously by changing the revolution frequency the first motor generator, and the revolution frequency individual motor generators are varied also in case of carrying out a speed change of the geared transmission. Therefore, the electric power is exchanged among the motor generators and the accumulator device when carrying out a speed change.

On the other hand, Japanese Patent Laid-Open No. 2005-264762 discloses a power transmission unit comprising a power distribution mechanism functioning as an electrical continuous transmission, and a geared transmission mechanism functioning as a geared mechanical transmission. The apparatus suggested by Japanese Patent Laid-Open No. 2005-264762 is provided with a locking mechanism for inhibiting a differential action of the power distribution mechanism, and an engine thereof is started by rotating a motor generator connected to the power distribution mechanism and an another motor generator connected to the geared transmission mechanism in the same direction when the geared transmission mechanism is neutral.

In the apparatuses disclosed in the aforementioned documents, the internal combustion engine is employed as a prime mover so that a torque inputted from the internal combustion engine changes periodically. Moreover, no small clearance should exist in some part of the power transmission line and this causes a chattering. Further, a road surface is bumpy and not always flat, therefore, the torque inputted from a driving wheel side also fluctuates periodically. As a result, a resonance phenomenon may occur to amplify vibrations and noises.

SUMMARY OF THE INVENTION

According to the present invention, there is provided a control system for a power transmission unit of a vehicle transmitting power outputted from a prime mover, comprising: a resonance detecting/predicting device detecting or predicting a generation of a resonance of the power transmission unit resulting from the power transmission; a driving condition detecting device for detecting a driving condition of a vehicle in case the generation of resonance is detected or predicted by the resonance detecting/predicting device; and a resonance dampening control selecting device for changing contents of a control for dampening the detected or predicted resonance on the basis of driving condition of the vehicle detected by the driving condition detecting device.

Preferably in addition to above, the control system for a power transmission unit of a vehicle comprises at least two kinds of controls for dampening resonance, such as a first resonance dampening control and a second resonance dampening control. Also, the aforementioned resonance dampening control selecting device includes a device for switching the resonance dampening control between the first resonance dampening control and the second resonance dampening control in accordance with the driving condition of the vehicle.

Preferably, the driving condition is categorized into at least a first driving condition and a second driving condition the power transmitting conditions thereof are different from each other, and the resonance dampening control selecting device includes a device for selecting the first resonance dampening control under the first driving condition, and for selecting the second resonance dampening control under the second driving condition.

Therefore, when a resonance resulting from the power transmission is detected or predicted, the contents of the resonance dampening control is selected in accordance with the driving condition. For this reason, an excessive vibration of the power transmission unit and a resultant augmentation of a stress can be suppressed. Consequently, vibrations and noises in the vehicle are dampened entirely, and durability of the power transmission unit can also be improved.

Preferably, in addition to above, the power transmission unit comprises a clutch mechanism capable of changing a transmission torque capacity thereof, and the first resonance dampening control includes a control for reducing the torque capacity of the clutch mechanism, thereby the resonance can be dampened by controlling the clutch mechanism such as a clutch and a brake, and this makes the control easy.

Preferably, in addition to above, a definition of the first driving condition is a condition where the vehicle is driven by an external force inputted from the other side of the prime mover, and a definition of the second driving condition is a condition where the vehicle is driven by the power outputted from the prime mover, thereby the resonance can be dampened by controlling the clutch mechanism even under the first driving condition.

According to another aspect of the invention, there is provided a control system for a power transmission unit of a vehicle transmitting power outputted from a prime mover, comprising: a resonance detecting/predicting device for detecting or predicting a generation of a resonance of the power transmission unit resulting from the power transmission; and a resonance dampening control device, which is capable of carrying out a plurality of resonance dampening controls dampening the resonance detected or predicted by the resonance detecting/predicting device in order of priority.

Therefore, a plurality of resonance dampening controls are carried out according to priority. For this reason, the resonance can be dampened effectively. Moreover, an appropriate resonance dampening control can be carried out according to a condition of the vehicle, therefore, the durability of the vehicle can be improved.

Preferably, in addition to the above, the power transmission unit comprises a clutch mechanism capable of changing a transmission torque capacity thereof, and the resonance dampening control device includes a device for carrying out a control of reducing the torque capacity of the clutch mechanism as a priority resonance dampening control, thereby the resonance is dampened by controlling the clutch mechanism such as a clutch and a brake on a priority basis. For this reason, the resonance is dampened easily and effectively.

Preferably, in addition to the above, the prime mover includes an internal combustion engine capable of changing an operating point thereof governed by an output torque and a revolution frequency or momentums corresponding to those factors; the power transmission unit includes at least any of a clutch mechanism, a transmission capable of varying a speed change ratio, and a differential mechanism performing a differential action selectively among at least three elements; and the control for dampening resonance is at least any of a control for reducing the torque capacity of the clutch mechanism, a control for changing an operating point of the internal combustion engine, a control for varying the speed change ratio, and a control for activating the differential mechanism in an inactive condition, thereby the resonance is dampened by controlling the mechanisms for transmitting the power to change the operating conditions thereof. For this reason, the resonance dampening control can be carried out easily.

Preferably, in addition to the above, the power transmission unit includes an electrical transmission part in which a ratio between the revolution frequencies of the input side and the output side is varied continuously by electrically controlling a torque to be established or absorbed, and a mechanical transmission part in which a ratio between the revolution frequencies of the input side and the output side is varied by changing a transmission route of the torque, thereby the resonance of a hybrid vehicle resulting from its running is dampened, therefore, riding comfort and durability of the vehicle are improved.

Further, this invention relates to a controlling method for a power transmission unit of a vehicle for executing aforementioned individual controls.

BRIEF DESCRIPTION OF THE DRAWINGS

FIG. 4 is a table showing a relation between gear stages set by a geared transmission part and engagement states of hydraulic frictional engagement devices.

DETAILED DESCRIPTION OF THE PREFERRED EMBODIMENT

Figure 3:
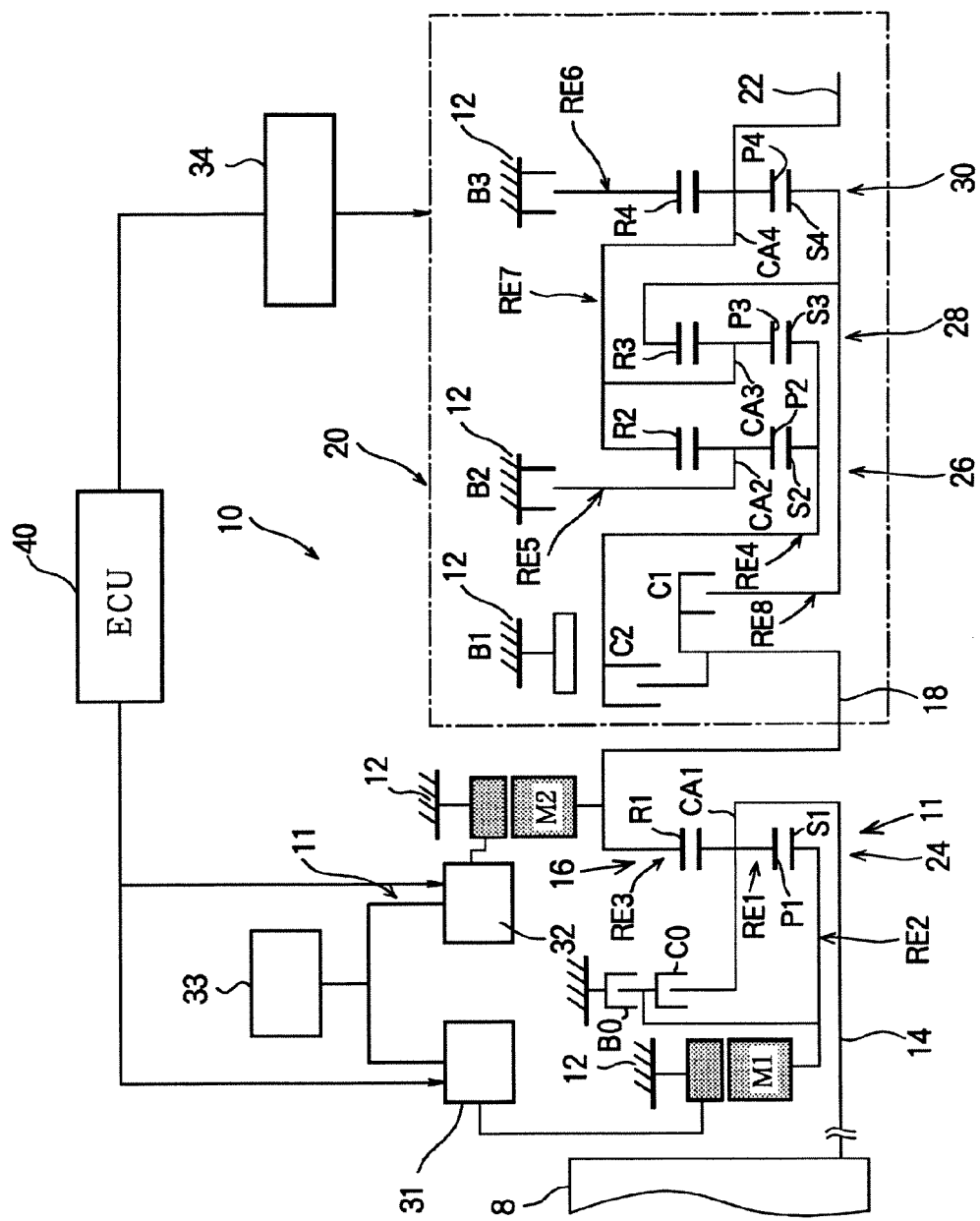
FIG. 3 is a skeleton diagram showing one example of a power transmission unit for a hybrid vehicle to which the invention is applied.

Next, this invention will be described in connection with its specific examples. A power transmission unit to which the invention is applied will be explained first of all. FIG. 3 is a skeleton diagram illustrating a power transmission unit 10 for hybrid vehicles to which a control system as one example of the invention is applied. As illustrated in FIG. 3, the power transmission unit 10 comprises, an input shaft 14 as an input rotary member arranged coaxially in a non-rotatable transmission case 12 (as will be called as a case 12 hereinafter) of a vehicle, an electrical continuously variable transmission part 11 connected to the input shaft 14 directly or indirectly through a not shown pulsation absorbing damper (i.e., a vibration dampening device), a mechanical transmission part 20 functioning as a geared transmission connected in tandem through a transmission member (i.e., a transmission shaft) 18 on a power transmission route between the continuously variable transmission part 11 and a (not-shown) driving wheel, and an output shaft 22 as an output rotary member connected to the mechanical transmission part 20. The above-listed elements are arranged in tandem in the power transmission unit 10. This power transmission unit 10 is suitable for front-engine rear-drive vehicles in which elements are arranged in tandem, and the power transmission unit 10 is arranged between an engine 8 as a prime mover for running and a not shown pair of driving wheels. The engine 8 is an internal combustion engine exemplified by a gasoline engine and a diesel engine or the like. Here, since the arrangement of the power transmission unit 10 is symmetrical with respect to its axial line, a lower part thereof is omitted in the skeleton diagram of FIG. 3. The same applies to the following embodiments.

The continuously variable transmission part 11 is a mechanism for mechanically distributing an output of the engine 8 inputted to a first electric motor M1 and to an input shaft 14. The continuously variable transmission part 11 comprises a power distributing mechanism 16 functioning as a differential mechanism for distributing the output of the engine 8 to the first electric motor M1 and to the transmission member 18, and a second electric motor M2 arranged to rotate integrally with the transmission member 18. The second electric motor M2 may be arranged any place on the power transmission route from the transmission member 18 to the driving wheel. According to this embodiment, both electric motors M1 and M2 are motor generators having a function to generate electric power. More specifically, the first electric motor M1 intrinsically has a function as a generator for generating a reaction force, and the second electric motor M2 intrinsically has a function as a motor for outputting a driving force for running the vehicle.

The power distributing mechanism 16 is composed mainly of a single pinion type first planetary gear mechanism 24, and a gear ratio thereof is e.g., approximately "0.418" and it is represented by "$\rho 1$". The first planetary gear mechanism 24 comprises following rotary elements, such as a first sun gear S1, a first planetary gear P1, a first carrier CA1 holding the first planetary gear P1 in a rotatable and revolvable manner, and a first ring gear R1 meshing with the first sun gear S1 through the first planetary gear P1. The aforementioned gear ratio $\rho 1$ is expressed as ZS1/ZR1. ZS1 represents a teeth number of the first sun gear S1, and ZR1 represents a teeth number of the first ring gear R1.

In the power distributing mechanism 16, the first carrier CA1 is connected to the input shaft 14, i.e., to the engine 8, the first sun gear S1 is connected to the first electric motor M1, and the first ring gear R1 is connected to the transmission member 18. A differential action of the power distributing mechanism 16 is achieved by allowing to rotate three elements of the first planetary gear mechanism 24, i.e., to rotate the first sun gear S1, the first carrier CA1 and the first ring gear R1 relatively with each other. As a result, the output of the engine 8 is distributed to the first electric motor M1 and to the transmission member 18, and the electric energy generated by the first electric motor M1 operated by a part of the output of the engine 8 is stored or drives the second electric motor M2. In consequence, the continuously variable transmission part 11 (or the power distributing mechanism 16) functions as an electrical differential mechanism to achieve a "continuously variable transmission state (i.e., an electrical CVT state where a differential ratio is varied continuously)", so that the revolution frequency of the transmission member 18 is varied continuously even if the engine 8 is driven at a predetermined speed. In short, when the power distributing mechanism 16 is performing the differential action, the continuously variable transmission part 11 is also performing the differential action. Specifically, the continuously variable transmission part 11 functions as an electrical continuously variable transmission, in which its speed change ratio Y0 (i.e., revolution frequency of the input shaft 14/revolution frequency of the transmission member 18) is varied continuously from a minimum value Y0min to a maximum value Y0max.

Moreover, the continuously variable transmission part 11 also functions as a geared transmission mechanism in which a gear stage is shifted between high and low. Specifically, a lock-up clutch C0 is provided between the first sun gear S1 and the first carrier CA1, and a speed increasing brake B0 fixing the first sun gear S1 selectively is further provided. For this reason, the first planetary gear mechanism 24 of the continuously variable transmission part 11 is rotated entirely and integrally by engaging the lock-up clutch C0 so that the power inputted from the engine 8 is outputted as it is to the transmission member 18. This is called a "Low state". On the other hand, when the speed increasing brake B0 is engaged instead of the lock-up clutch C0, the first sun gear S1 functions as a fixing member and the first carrier CA1 functions as an input member. Consequently, the first ring gear R1 integral with the transmission member 18 is rotated at increased speed in comparison with the revolution frequency of the engine (i.e., the revolution frequency of the first carrier CA1) as the input speed. This is called a "High state".

The mechanical transmission part 20 comprises a single pinion type second planetary gear mechanism 26, a single pinion type third planetary gear mechanism 28 and a single pinion type fourth planetary gear mechanism 30. The second planetary gear mechanism 26 comprises a second sun gear S2, a second planetary gear P2, a second carrier CA2 holding the second planetary gear P2 in a rotatable and revolvable manner, and a second ring gear R2 meshing with the second sun gear S2 through the second planetary gear P2. The second planetary gear mechanism 26 has a predetermined gear ratio $\rho 2$ which is approximately "0.562". The third planetary gear mechanism 28 comprises a third sun gear S3, a third planetary gear P3, a third carrier CA3 holding the third planetary gear P3 in a rotatable and revolvable manner, and a third ring gear R3 meshing with the third sun gear S3 through the third planetary gear P3. The third planetary gear mechanism 28 has a predetermined gear ratio $\rho 3$ which is approximately "0.425". The fourth planetary gear mechanism 30 comprises a fourth sun gear S4, a fourth planetary gear P4, a fourth carrier CA4 holding the fourth planetary gear P4 in a rotatable and revolvable manner, and a fourth ring gear R4 meshing with the fourth sun gear S4 through the fourth planetary gear P4. The fourth planetary gear mechanism 30 has a predetermined gear ratio $\rho 4$ which is approximately "0.421". The aforementioned gear ratios $\rho 2$ is expressed as ZS2/ZR2, $\rho 3$ is expressed as ZS3/ZR3, and $\rho 4$ is expressed as ZS4/ZR4. Here, ZS2 represents a teeth number of the second sun gear S2, ZR2 represents a teeth number of the second ring gear R2, ZS3 represents a teeth number of the third sun gear S3, ZR3 represents a teeth number of the third ring gear R3, ZS4 represents a teeth number of the fourth sun gear S4, and ZR4 represents a teeth number of the fourth ring gear R4.

Here will be explained a relation of connection in the mechanical transmission part 20. The second sun gear S2 and the third sun gear S3 are connected integrally with each other. Those sun gears S2 and S3 are connected selectively to the transmission member 18 through the second clutch C2, and also connected selectively to the case 12 through a first brake B1. The second carrier CA2 is connected selectively to the case 12 through a second brake B2. The fourth ring gear R4 is connected selectively to the case 12 through a third brake B3. The second ring gear R2, the third carrier CA3 and the fourth carrier CA4 are connected integrally, and they are connected to the output shaft 22. The third ring gear R3 and the fourth sun gear S4 are connected integrally, and they are connected selectively to the transmission member 18 through the first clutch C1.

The aforementioned lock-up clutch C0, first clutch C1, second clutch C2, speed increasing brake B0, first brake B1, second brake B2 and third brake B3 are hydraulic frictional engagement devices generally used in conventional automatic transmissions for a vehicle. Those hydraulic frictional engagement devices are composed mainly of a wet multiple disc clutch in which a plurality of frictional discs facing with each other are pressed by a hydraulic actuator, a band brake in which one of the end of one or two band(s) applied to an outer circumferential face of a rotating drum is (are) wound up by a hydraulic actuator, and so on. The role of the hydraulic frictional engagement device is to connect the members of both sides thereof selectively Here, those lock-up clutch C0, first clutch C1, second clutch C2, speed increasing brake B0, first brake B1, second brake B2 and third brake B3 correspond to the clutch mechanism of the present invention.

According to the power transmission unit 10 thus far explained, as indicated in the table of FIG. 4, any of first gear stage (represented as 1st in the table) to a fifth gear stage (represented as 5th in the table), reverse gear stage (represented as R in the table), and neutral (represented as N in the table) are established by selectively activating the aforementioned elements, specifically, by selectively engaging the lock-up clutch C0, the first clutch C1, the second clutch C2, the speed increasing brake B0, the first brake B1, the second brake B2 and the third brake B3. As a result, a speed change ratio Y (i.e., input shaft speed NIN/output shaft speed NOUT), which changes substantially in equal ratio at every gear stage is obtained. It is to be especially noted that the continuously variable transmission part 11 and the mechanical transmission part 20 achieve the continuously variable transmission state, by releasing the lock-up clutch C0 and the speed increasing brake B0 thereby allowing the continuously variable transmission part 11 to function as a continuously variable transmission.

As an example, here will be explained a case in which the power transmission unit 10 is used as a geared transmission, by engaging the lock-up clutch C0 or the speed increasing brake B0 to fix the speed change ratio of the continuously variable transmission part 11 or the differential ratio of the differential mechanism. As shown in FIG. 4: the first gear stage is established by engaging the lock-up clutch C0, the first clutch C1 and the third brake B3; the second gear stage is established by engaging the lock-up clutch C0, the first clutch C1 and the second brake B2; the third gear stage is established by engaging the lock-up clutch C0, the first clutch C1 and the first brake B1; the fourth gear stage is established by engaging the lock-up clutch C0, the first clutch C1 and the second clutch C2; and the fifth gear stage is established by engaging the first clutch C1, the second clutch C2 and the speed increasing brake B0. The reverse gear stage is established by engaging the second clutch C2 and the third brake B3. Additionally, all of the frictional engagement devices are released to establish Neutral.

Meanwhile, in case the power transmission unit 10 functions as a continuously variable transmission, the lock-up clutch C0 and the speed increasing brake B0 are released to allow the continuously variable transmission part 11 functions as a continuously variable transmission, and the mechanical transmission part 20 arranged in tandem functions as a geared transmission. As a result, the input speed to the mechanical transmission part 20, specifically, the speed of the transmission member 18 to be inputted to the individual first to fourth gear stages of the mechanical transmission part 20 is varied continuously, and the individual gear stages thereby obtain a continuous range of the speed change ratio. For this reason, the speed change ratio can be varied steplessly and continuously even between the gear stages. Consequently, a speed change ratio YT achieved by the continuously variable transmission part 11 and the mechanical transmission part 20, more specifically, a total speed change ratio YT as an entire speed change ratio of the power transmission unit 10, which is formed on the basis of the speed change ratio Y0 of the continuously variable transmission part 11 and the speed change ratio Y of the mechanical transmission part 20, is established steplessly.

Figure 5:
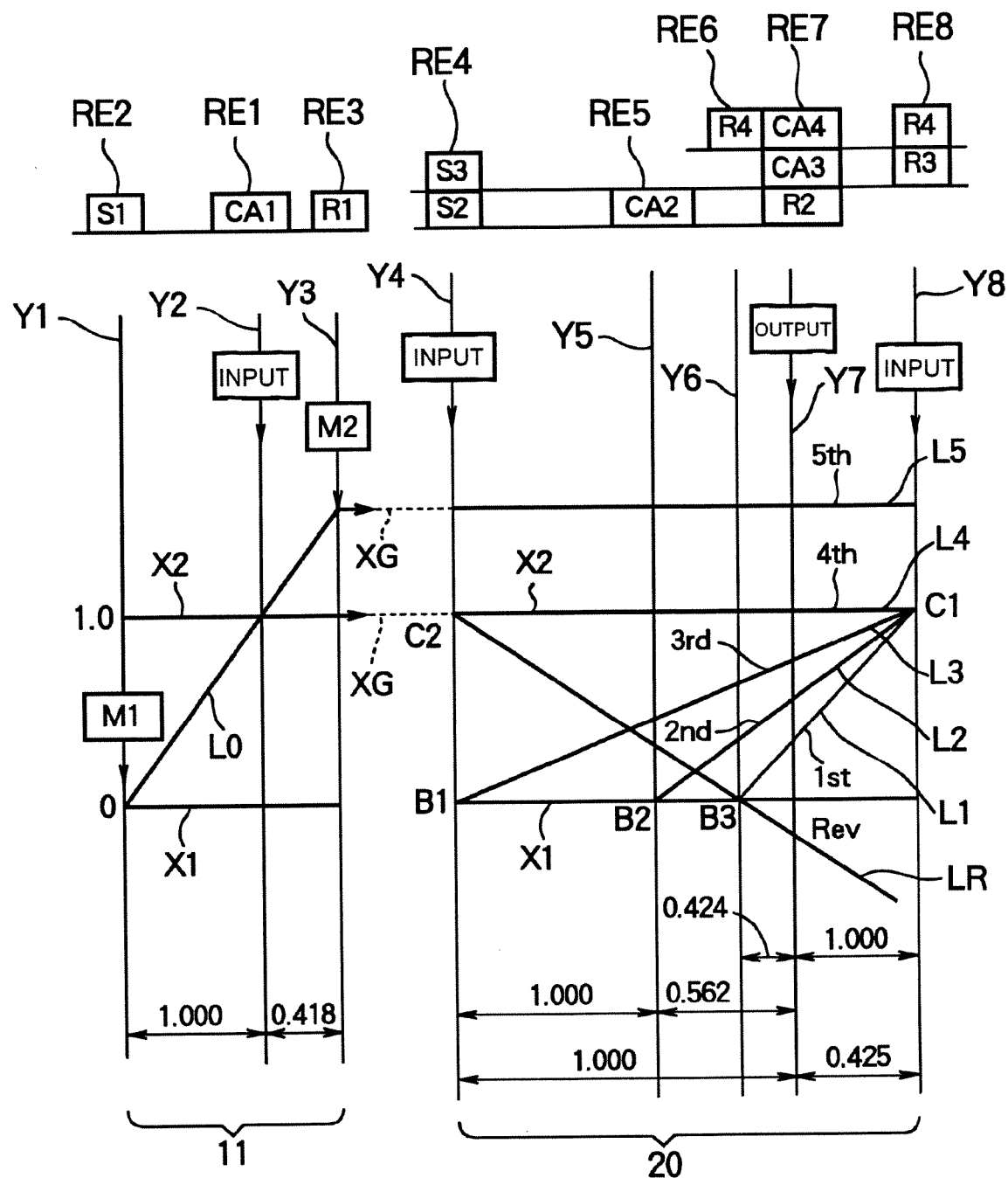
FIG. 5 is a nomographic diagram explaining operating states of individual transmission parts shown in FIG. 3.

FIG. 5 is a nomographic diagram linearly indicating a relation of revolution frequencies of the rotary elements which are connected depending on the gear stages, in the power transmission unit 10 comprising the continuously variable transmission part 11 functioning as a differential part or a first transmission part, and the mechanical transmission part 20 functioning as a (an automatic) transmission part or a second transmission part. The nomographic diagram of FIG. 5 is a two-dimensional coordinate composed of abscissa axes indicating relations of the gear ratios "ρ" of individual planetary gear mechanisms 24, 26, 28 and 30, and longitudinal axes indicating relative speeds. In the diagram, the bottom abscissa axis X1 represent the speed of "zero", and the middle abscissa axis X2 represents the speed of "1.0", i.e., a speed Ne of the engine 8 connected with the input shaft 14, and an abscissa axis XG represents a revolution frequency of the transmission member 18.

Meanwhile, three longitudinal axes Y1, Y2 and Y3 individually indicates relative revolution frequencies of three elements of the power distributing mechanism 16 of the continuously variable transmission part 11. Specifically, Y1 indicates relative revolution frequency of the first sun gear S1 corresponding to a second rotary element (or a second element) RE2, Y2 indicates relative revolution frequency of the first carrier CA1 corresponding to a first rotary element (or a first element) RE1, and Y3 indicates relative revolution frequency of the first ring gear R1 corresponding to a third rotary element (or a third element) RE3. Clearances between those longitudinal axes Y1 to Y3 are determined individually in accordance with a gear ratio ρ1 of the first planetary gear mechanism 24. Five longitudinal axes Y4 to Y8 individually represent the rotary elements of the mechanical transmission part 20. Specifically, Y4 represents the mutually connected second sun gear S2 and third sun gear S3 corresponding to a fourth rotary element (or a fourth element) RE4, Y5 represents the second carrier CA2 corresponding to a fifth rotary element (or a fifth element) RE5, Y6 represents the fourth ring gear R4 corresponding to a sixth rotary element (or a sixth element) RE6, Y7 represents the mutually connected second ring gear R2, third carrier CA3 and fourth carrier CA4 corresponding to a seventh rotary element (or a seventh element) RE7, and Y8 represents the mutually connected third ring gear R3 and fourth sun gear S4 corresponding to an eighth rotary element (or a eighth element) RE8. Clearances between those longitudinal axes Y4 to Y8 are determined individually in accordance with a gear ratios ρ2, ρ3 and ρ4 of the second to fourth planetary gear mechanisms 26, 28 and 30. Provided that the clearance between the longitudinal axes representing the sun gear and the carrier is set to "1", the clearance between the longitudinal axes representing the carrier and the ring gear indicates the gear ratio ρ of the planetary gear mechanism. Specifically, in the continuously variable transmission part 11, the clearance between the longitudinal axes Y1 and Y2 is set to "1", and the clearance between Y2 and Y3 is set to the gear ratio ρ1. In the second to fourth planetary gear mechanisms 26, 28 and 30 of the mechanical transmission part 20, also, each clearance between the carrier and the ring gear is set to "1" and each clearance between the carrier and the ring gear is set to "ρ".

As can be seen from the nomographic diagram in FIG. 5, in the power distributing mechanism 16 (or the continuously variable transmission part 11) of the power transmission unit 10 of this embodiment, the first rotary element RE1 (or the first carrier CA1) of the first planetary gear mechanism 24 is connected to the input shaft 14, i.e., to the engine 8, the second rotary element RE2 is connected to the first electric motor M1, and the third rotary element RE3 (or the first ring gear R1) is connected to the transmission member 18 and to the second electric motor M2. Therefore, a rotation of the input shaft 14 is transmitted (i.e., inputted) to the mechanical transmission part 20 via the transmission member 18. The relation between the revolution frequencies of the first sun gear S1 and the first ring gear R1 is indicated by a slant line L0 passing through a point at the intersection of Y2 with X2.

If the revolution frequency of the first sun gear S1 indicated at the intersection of the line L0 with the longitudinal axis Y1 is fluctuated by controlling the reaction force resulting from a generation of the first electric motor M1, the revolution frequency of the first ring gear R1 indicated at the intersection of the line L0 with the longitudinal axis Y3 is fluctuated.

On the other hand, in the mechanical transmission part 20, the fourth rotary element RE4 is connected selectively to the transmission member 18 through the second clutch C2 and to the case 12 through the first brake B1, the fifth rotary element RE5 is connected selectively to the case 12 through the second brake B2, the sixth rotary element RE6 is connected selectively to the case 12 through the third brake B3, the seventh rotary element RE7 is connected to the output shaft 22, and the eighth rotary element RE8 is connected selectively to the transmission member 18 through the first clutch C1.

As shown in FIG. 5, in the mechanical transmission part 20, a revolution frequency of the output shaft 22 at the first gear stage is indicated at the intersection of the slant line L1 with the longitudinal axis Y7 indicating the revolution frequency of the seventh rotary element RE7 connected to the output shaft 22. Here, the line L1 is determined as a result of engagement of the first clutch C1 and the third brake B3, and it extends from the intersection of the longitudinal axis Y6 indicating the revolution frequency of the sixth rotary element RE6 with the abscissa axis X1, to the intersection of the longitudinal axis Y8 indicating the revolution frequency of the eighth rotary element RE8 with the abscissa axis X2. As in the case of the first gear stage: a revolution frequency of the output shaft 22 at the second gear stage is indicated at the intersection of the longitudinal axis Y7 with a slant line L2 determined as a result of engaging the first clutch C1 and the second brake B2; a revolution frequency of the output shaft 22 at the third gear stage is indicated at the intersection of the longitudinal axis Y7 with a slant line L3 determined as a result of engaging the first clutch C1 and the first brake B1; and a revolution frequency of the output shaft 22 at the fourth gear stage is indicated at the intersection of the longitudinal axis Y7 with a horizontal line L4 determined as a result of engaging the first clutch C1 and the second clutch C2. At the aforementioned first to fourth gear stages, the power is inputted from the continuously variable transmission part 11 or the power distributing mechanism 16 to the eighth rotary element RE8 at the revolution frequency identical to the revolution frequency of the engine Ne by controlling the revolution frequency of the first electric motor M1. On the other hand, in case the first sun gear S1 is fixed by halting the rotation of the first electric motor M1, the power from the continuously variable transmission part 11 is inputted at the revolution frequency higher than the revolution frequency of the engine NE. Therefore, a revolution frequency of the output shaft 22 at the fifth gear stage is indicated at the intersection of the longitudinal axis Y7 with a horizontal line L5 determined as a result of engaging the first clutch C1 and the second clutch C2.

In order to control the first electric motor M1, there is provided a first controller 31. Also, in order to control the second electric motor M2, there is provided a second controller 32. Those controllers 31 and 32 are composed e.g., mainly of an inverter The roles of those controllers 31 and 32 are to operate the individual electric motors M1 and M2 as electric motors or generators, and to control the revolution frequencies and the torques thereof depending on the situation. The electric motors M1 and M2 are individually connected with an accumulator device 33 through the controllers 31 and 32. The accumulator device 33 is a device for feeding electric power to the electric motors M1 and M2, and storing the electric power generated by the electric motors M1 and M2 in case those electric motors function as generators. The accumulator device 33 is composed mainly of a secondary battery and a capacitor.

Also, in order to control applying pressure and releasing pressure for the aforementioned clutches and brakes, there is provided a hydraulic control unit 34. The functions of the hydraulic control unit 34 are to regulate oil pressure established by an (not shown) oil pump to the line pressure, to control the applying pressure of the individual frictional engagement devices based on the line pressure as an initial pressure, and to control the releasing pressure to release the frictional engagement devices. Specifically, known hydraulic control units may be employed as the hydraulic control unit 34.

Further, there is provided an electronic control unit (ECU) 40 for entirely controlling the power transmission unit 10 by controlling the aforementioned controllers 31 and 32, and the hydraulic control unit 34 by electronic signals. The signals inputted to the electronic control unit 40, and the signals outputted form the electronic control unit 40 are listed in FIG. 6. The electronic control unit 40 comprises a microcomputer composed mainly of CPU, ROM, RAM and an input/output interface. The electronic control unit 40 carries out drive controls, e.g., a hybrid drive control of the engine 8 and the first and the second electric motors M1 and M2, and a shift control of the mechanical transmission part 20, by carrying out a signal process in accordance with a program stored in ROM in advance while using a temporal storage function of RAM.

Figure 6:
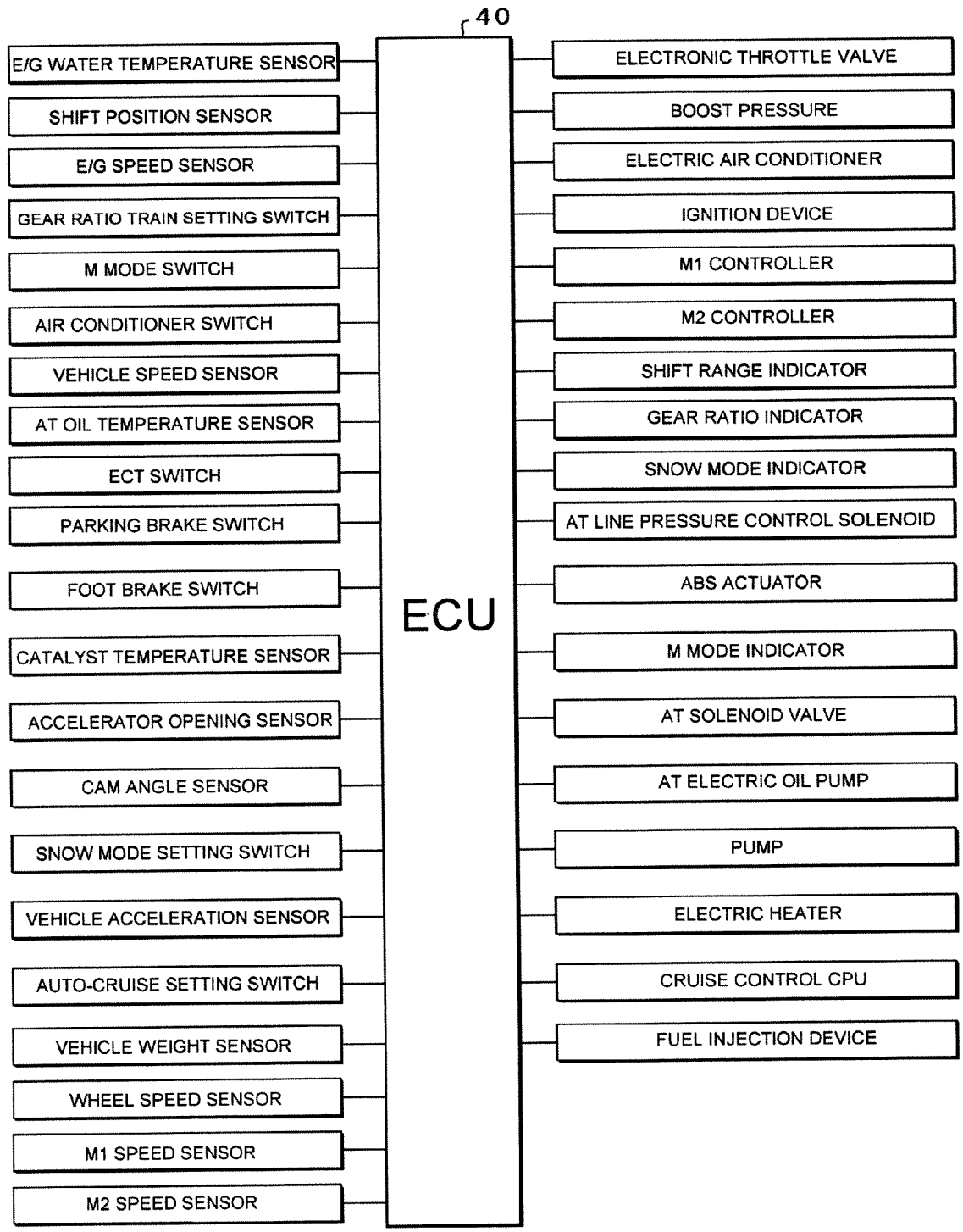
FIG. 6 is a diagram showing an example of input signals and output signals of an electronic control unit.

As shown in FIG. 6, a signal indicating a water temperature of the engine, a signal indicating a shift position, a signal indicating the revolution frequency Ne of the engine 8, a signal indicating the gear ratio train setting value, a signal indicating a M mode (i.e., a motor running mode), a signal indicating an operation of an air-conditioner, a signal indicating a vehicle speed corresponding to the revolution frequency NOUT of the output shaft 22, a signal indicating an oil temperature of an operating oil (i.e., an AT oil temperature) of the mechanical transmission part 20, a signal indicating an operation of a parking brake, a signal indicating an operation of a foot brake, a signal indicating a temperature of a catalyst, an accelerator opening signal indicating a stepping amount of the accelerator corresponding to an output demand of the driver, a cam angle signal, a signal indicating a snow mode setting, an acceleration signal indicating a longitudinal acceleration of the vehicle, a signal indicating an auto-cruise running, a signal indicating a weight of the vehicle, a signal indicating a speed of individual wheels, a signal indicating a revolution frequency of the electric motor M1, a signal indicating a revolution frequency of the electric motor M2 and so on, are inputted to the electronic control unit 40.

On the other hand, a driving signal to a throttle actuator for controlling an opening of an electronic throttle valve, a fuel feeding signal for controlling a feeding amount of the fuel from a fuel injection device to the engine 8, a boost regulating signal for regulating a boost pressure, a signal for activating the electric air-conditioner, an ignition signal for commanding a timing to ignite the engine 8 by an ignition device, a command signal to the individual controllers for commanding an operation of the electric motors M1 and M2, a shift position (or an operating position) indicating signal for activating a shift indicator, a signal indicating a gear ratio, a signal indicating a snow mode, a signal for activating an ABS actuator for preventing a slippage of the wheel at a braking time, an M mode indication signal indicating that M mode is selected, a valve command signal for activating a solenoid valve of the hydraulic control unit 34 so as to control the hydraulic actuator of the hydraulic frictional engagement device of the mechanical transmission part 20, a drive command signal for activating an electric hydraulic pump as a hydraulic source of the hydraulic control unit 34, a signal for activating an electric heater, a signal to a computer for carrying out a cruise control and so on, are outputted from the electronic control unit 40.

Figure 7:
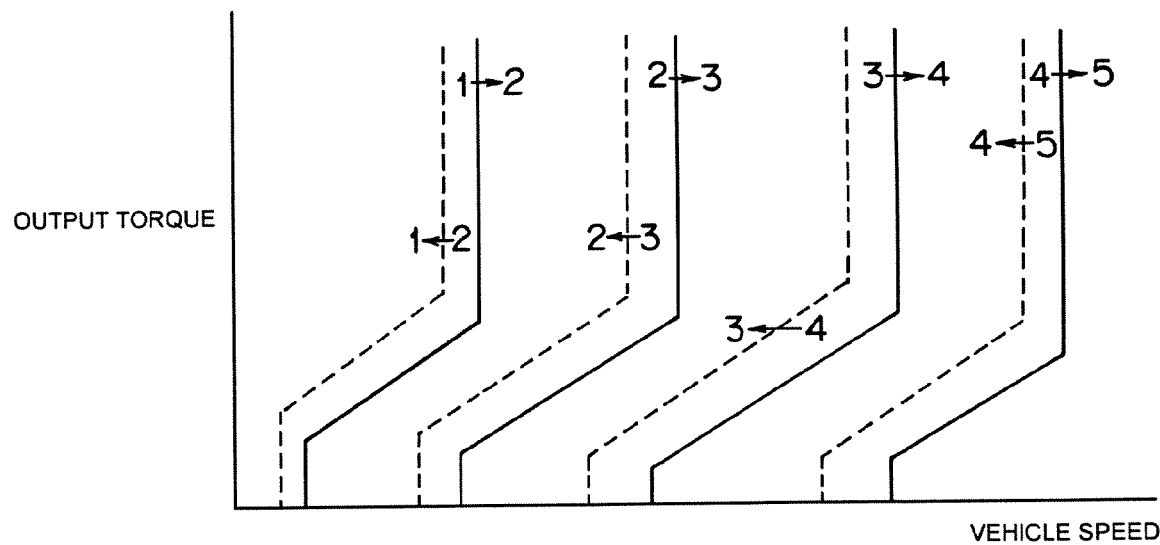
FIG. 7 is a diagram schematically showing one example of a speed change diagram of the mechanical transmission part.

FIG. 7 shows a shifting diagram used for a shifting control of the mechanical transmission part 20. In FIG. 7, an abscissa axis represents a vehicle speed and a longitudinal axis represents an output demand, and gear stage regions are defined using the vehicle speed and the output demand as parameters. Also, in FIG. 7, solid lines are upshift lines as boundaries of the individual gear stage regions for the case of upshifting, and broken lines are downshift lines as boundaries of the individual gear stage regions for the case of downshifting.

Figure 8:
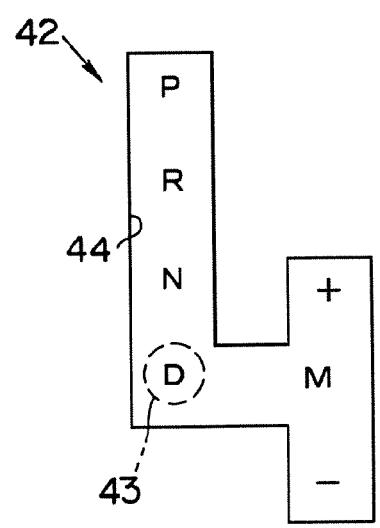
FIG. 8 is a diagram showing one example of an arrangement of a shift position of a shifting device.

All of those gear stages can be established in case a drive range (i.e., drive position) is selected, however, the gear stages of high speed side are restricted under a manual shifting mode (i.e., manual mode). FIG. 8 illustrates an arrangement of shift positions in a shifting device 42 for outputting a shift position signal to the aforementioned electronic control unit 40. In the shifting device 42, a parking (P) for keeping the vehicle being stopped, a reverse (R), a neutral (N) and a drive (D) positions are arranged linearly in an anteroposterior direction of the vehicle. A manual position (M) is arranged adjacent to the drive position (D) in the width direction of the vehicle, and an upshift position (+) and a downshift position (−) are arranged above and below the manual position. Those shift positions are connected through a guide groove 44 guiding a shift lever 43. Therefore, the shift position is selected arbitrary by moving the shift lever 43 along the guide groove 44, and the shift position signal of selected position is inputted to the electronic control unit 40.

In case the drive position is selected, all of the forward stages of the mechanical transmission part 20 from the first to fifth stages can be set depending on a running condition. On the other hand, in case the shift lever 43 is moved from the drive position to the manual position, the drive position is maintained and a shifting can be made up to the fifth stage. However, in this case, a downshift signal (i.e., a down range signal) is outputted each time the shift lever 43 is moved to the downshift position. As a result, the gear stage is shifted sequentially to a 4th range where the fifth stage is inhibited, a 3rd range where the fourth or higher stages are inhibited, a 2nd stage where the third or higher stages are inhibited, and an L range where the gear stage is fixed to the first stage. To the contrary, an upshift signal is outputted each time the shift lever 43 is moved to the upshift position, so that the gear stage is shifted sequentially to the higher range.

Figure 1:
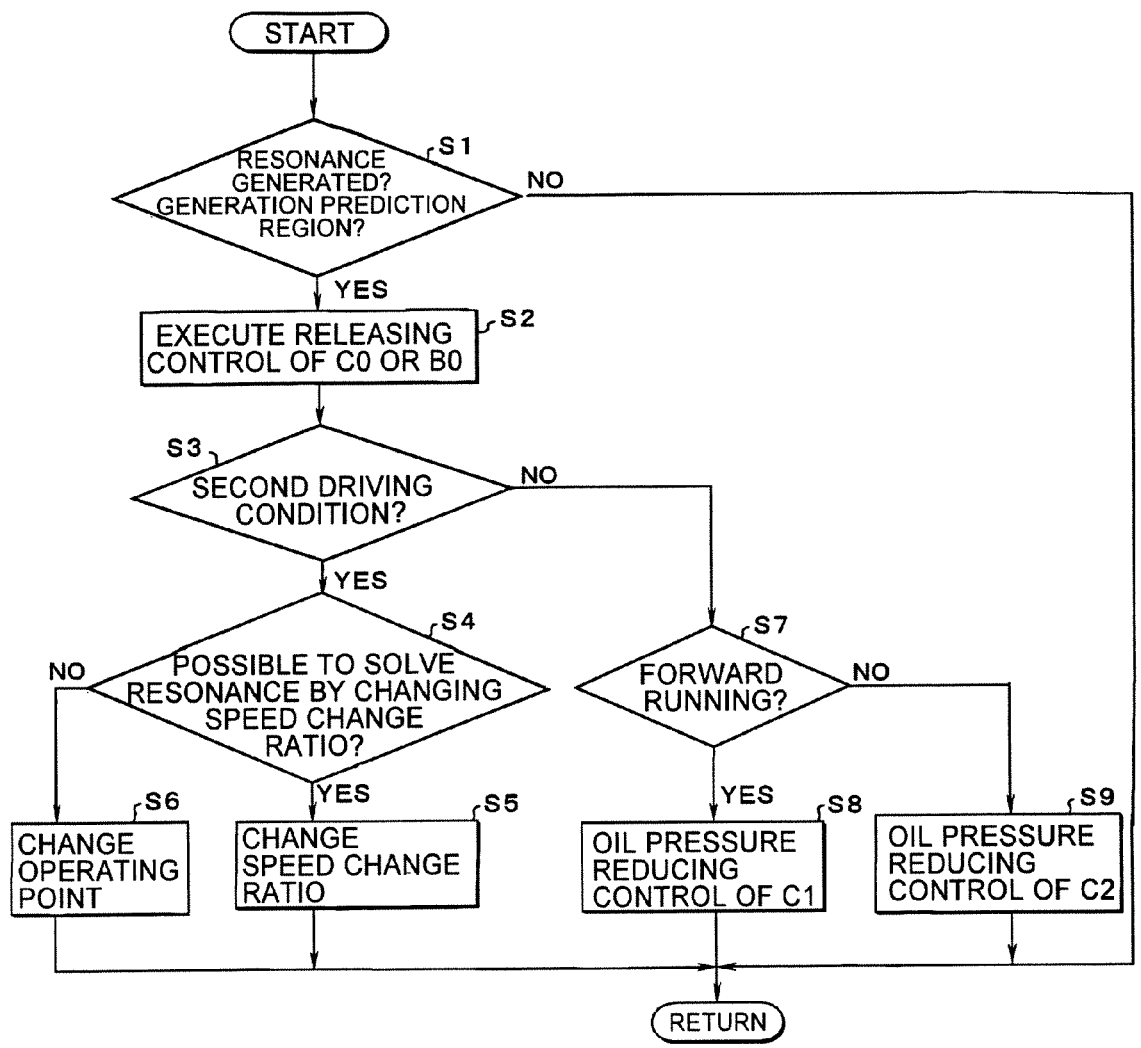
FIG. 1 is a flowchart for explaining one example of the resonance dampening control carried out by a control system of this invention.

In case the vehicle having the aforementioned power transmission unit 10, a torque fluctuating periodically due to an unevenness of road surface or the like is inputted thereto from the driving wheel. If the frequency of the inputted torque harmonizes with the intrinsic resonance frequency of the power transmission unit 10 or the vehicle, the vibrations and noises are amplified due to the resonance. In order to dampen or reduce such resonance, the control system of the present invention carries out a control shown in FIG. 1.

First of all, it is judged whether or not a resonance is generated, or a generation of the resonance is predicted (at Step S1). The resonance envisaged at this step is the resonance resulting from the input of the torque from the driving wheel side, and driving conditions where resonances is caused, e.g., a speed to generate resonances may be measured in advance by carrying out a bench test of the vehicle. Therefore, it is possible to detect or predict the resonance on the basis of the measured data. The resonance may also be detected directly from the fluctuation in the torque or revolution frequency. In case the answer of Step S1 is NO, this means that there is no possibility of generation of the resonance. In this case, the routine is returned without carrying out any control.

To the contrary, in case the answer of Step S1 is YES, a control to release the lock-up clutch C0 or the speed increasing brake B0 of the power distributing mechanism 16 (or the continuously variable transmission part 11) is carried out (at Step S2). Specifically, if those frictional engagement elements are engaged completely, those elements are released or released halfway so as to reduce the torque capacity thereof. A main object of this control is to dampen or to eliminate the resonance, by changing the torque transmitting condition between the engine 8 and the driving wheel under the condition where the engine 8 and the mechanical transmission part 20 is connected directly under the "Low state" or "High state", or changing the substantial mass of the vibration system therebetween, by adding or absorbing a torque by the first electric motor M1. A second object of this control is to vary the operating point of the engine 8 by controlling the first electric motor M1.

Then, it is judged whether or not the vehicle is under the second driving condition (at Step S3). The mass and the elastic coefficient of the vibration system are involved in the resonance frequency. Therefore, the resonance frequency is varied if the mass of the vibration system is varied, and the resonance thereby dampened or reduced. For this reason, in case of the aforementioned power transmission unit 10, the resonance can be dampened or reduced if reducing the substantial mass of the vibration system by reducing the torque capacity of the clutch mechanisms such as the clutch and the brake intervening in the power transmission line between the engine 8 and the driving wheel. However, if the torque capacity of the clutch mechanism is reduced, the torque applied to the driving wheel from the engine 8 side is also reduced and this may affect a running condition. Since the effect of the reduction in the applying torque to the driving wheel is much serious if the vehicle is under the second driving condition rather than the first driving condition, the judgment for judging whether or not the vehicle is under the second driving condition is carried out at Step S3 prior to selecting the contents of the resonance dampening control. Here, as mentioned above, the first driving condition is a condition where the vehicle is driven by an external force inputted from the other side of the prime mover, and the second driving condition is a condition where the vehicle is driven by the power outputted from the prime mover.

If the vehicle is under the second driving condition so that the answer of Step S3 is YES, the resonance dampening control not to change the driving torque at the driving wheel as much as possible is selected. For this purpose, it is judged whether or not the resonance can be solved by changing the speed change ratio (at Step S4). Therefore, propriety of changing the speed change ratio (i.e., a ratio between the input revolution frequency and the output revolution frequency) of the aforementioned continuously variable transmission part 11, and propriety of changing the gear ratio (i.e., a ratio between the input revolution frequency and the output revolution frequency) of the mechanical transmission part 20, are judged at this step. Thus, at Step S4, a possibility to dampen the resonance by changing the speed change ratio while keeping the entire speed change ratio of the vehicle as much as possible is judged.

When the speed change ratio of the continuously variable transmission part 11 is varied, the revolution frequencies of the individual electric motors M1 and M2 are varied. Also, when the gear ratio of the mechanical transmission part 20 is varied, the revolution frequencies of the rotary members such as gears in the mechanical transmission part 20 are varied. For this reason, if the speed change ratio of the continuously variable transmission part 11 is increased while the gear ratio of the mechanical transmission part 20 is decreased, the substantial mass of the vibration system or a vibration mode is changed. As a result, a resonance point is changed so that resonance may be dampened or avoided. For this purpose, the resonance points and the vibration modes of each combination of the speed change ratios are found in advance by carrying out an experiment or a simulation, and the combination of the speed change ratios, which does not correspond to the detected or predicted resonance frequencies, is selected. At Step S4, an availability of selecting the combinations of the individual speed change ratios is judged, while judging an availability of the data obtained from the experiment or simulation carried out in advance.

In case the answer of Step S4 is YES, the speed change ratio of the continuously variable transmission part 11 and the gear ratio of the mechanical transmission part 20 are individually changed to the speed change ratios capable of dampening the resonance judged at Step 4 (at Step S5). The operating point of the engine 8 will not be changed even if such control is carried out. Therefore, the engine 8 can be operated under the optimal fuel economy so that deterioration in the fuel economy can be prevented, and discomfort for the driver can also be minimized. Moreover, a major torque or load will not be applied to the power transmission unit 10, therefore, durability of the power transmission unit 10 can be improved, and deterioration in riding comfort can be prevented.

To the contrary, in case the answer of Step S4 is NO, the operating point of the engine 8 is changed (at Step S6). Specifically, the revolution frequency of the engine 8 is changed by varying the revolution frequency of the electric motor M1. In this case, in order to maintain the torque of the transmission member 18 as an output member of the continuously variable transmission part 11 as much as possible, the torque is added or absorbed by the second electric motor M2.

If the operating point of the engine 8 is changed while maintaining the output thereof, the revolution frequency and the output torque thereof will be changed. This makes the frequency of the torque acts on the power transmission unit 10 from the engine 8 side different from the frequency of the torque inputted from the driving wheel side. Consequently, the resonance is dampened or reduced, and deterioration in durability of the power transmission unit 10 is prevented or avoided.

On the other hand, in case the vehicle is under the first driving condition so that the answer of Step S3 is NO, then, it is judged whether or not the vehicle is running forward (at Step S7). This judgment is carried out to determine the current status of the clutches involved in the transmission of the torque. In case the vehicle is running forward so that the answer of Step S7 is YES, the first clutch C1 shown in FIG. 3 is functioning as an input clutch in the mechanical transmission part 20. Therefore, the torque capacity of the first clutch C1 is reduced (at Step S8). Specifically, the applying pressure of the first clutch C1 is reduced. To the contrary, in case the vehicle is running backward so that the answer of Step S7 is NO, the second clutch C2 shown in FIG. 3 is functioning as an input clutch in the mechanical transmission part 20. Therefore, the applying pressure of the second clutch C2 is reduced to reduce the torque capacity thereof (at Step S9).

Figure 2:
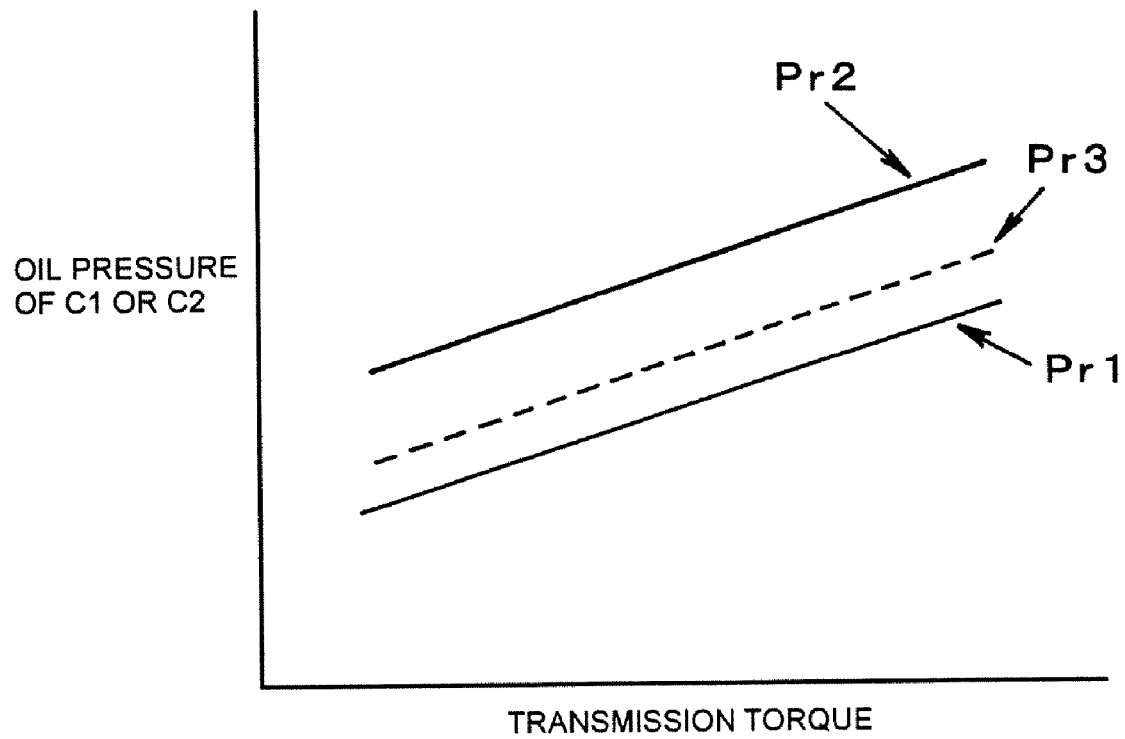
FIG. 2 is a diagram schematically showing a relation between an oil pressure and a torque capacity of the clutch.

Here will be explained with respect to an applying pressure of the clutches C1 and C2. The role of the clutches C1 and C2 is to transmit the torque inputted from the continuously variable transmission part 11 (or the power distributing mechanism 16) to the mechanical transmission part 20 in either traveling direction of the vehicle. Therefore, the torque capacity equivalent to or larger than the torque to be transmitted is required for the clutches C1 and C2. The torque capacity (i.e., a transmission torque) fluctuates according to the applying pressure, specifically, the more applying pressure, the more torque capacity. Additionally, when the vehicle is running, the input torque may by raised temporary due to abrupt acceleration and deceleration, and the torque inputted from the driving wheel side may also be raised temporary In order to avoid a slippage resulting from such a temporal rise in the torque, the applying pressure is set to have a safety margin. In FIG. 2, a line Pr1 represents the oil pressure for the torque to be transmitted (i.e., a required torque), and Pr2 represents an oil pressure having a safety margin. The vehicle can keep on running even if the applying pressure is changed between the lines Pr1 and Pr2. Therefore, the applying pressure is reduced to Pr3 between Pr1 and Pr2 at Step S8 or S9, by reducing the safety rate for example.

When the resonance is generated, the torque applied to the clutches C1 and C2 transmitting the torque at the time increases periodically. Therefore, the clutches C1 and C2 may slip if the torque capacities thereof are reduced by reducing the applying pressures so that transmission of the increased torque may be interrupted. The resonance is dampened or avoided by such a change of the transmitting condition of the torque, and as a result, deteriorations in a riding comfort and in a durability of the power transmission unit 10 can be prevented or suppressed.

Here will be briefly described the relations between the aforementioned specific example and this invention. The functional means for carrying out the control of Step S1 shown in FIG. 1 corresponds to the resonance detecting/predicting device of the invention; the functional means for carrying out the control of Step S3 corresponds to the driving condition detecting device of the invention; and the functional means for carrying out the controls of Steps S4 to S9 correspond to the resonance dampening control selecting device of the invention. Meanwhile, the controls of Steps S8 and S9 correspond to the first resonance dampening control of the invention; and the controls of Steps S5 and S6 correspond to the second resonance dampening control of the invention. Further, the driving condition negatively judged at Step S3 corresponds to the first driving condition of the invention; and the driving condition affirmatively judged at Step S3 corresponds to the second driving condition of the invention. Furthermore, the clutches C0, C1 and C2, and the brakes B0, B1, B2 and B3 correspond to the clutch mechanism of the invention.

Figure 9:
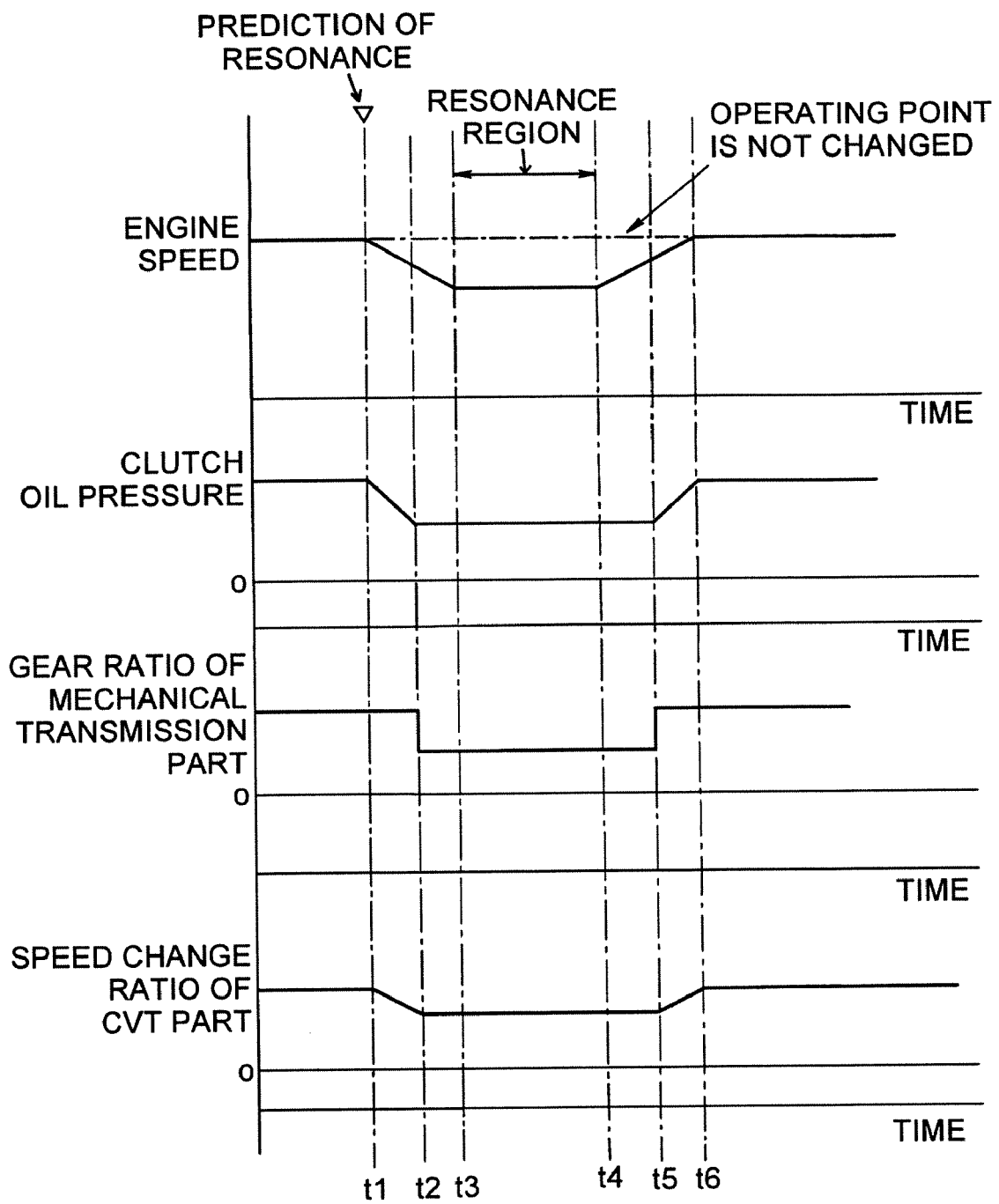
FIG. 9 is a time chart showing a change in a revolution frequency of an engine, an oil pressure of the clutch, a gear ratio of the mechanical transmission part, and a speed change ratio of the continuously variable transmission part, in case of carrying out a control for dampening an resonance by changing those elements.

The present invention should not be limited to the specific example as thus far described. The aforementioned resonance dampening controls may be carried out not only individually, but also be carried out in combination with any of the resonance dampening controls. FIG. 9 is a time chart showing a control example for changing the revolution frequency of the engine, the oil pressure of the clutch, the gear ratio of the mechanical transmission part and the speed change ratio of the continuously variable transmission part, along with a satisfaction of the prediction of the resonance. In FIG. 9, the prediction of the resonance is satisfied at the point of time t1. At the point of time t1, the revolution frequency of the engine is lowered gradually by changing the operating point, the oil pressure of the clutch functioning as an input clutch at this running condition is lowered gradually, and the speed change ratio of the continuously variable transmission part is reduced gradually. On the other hand, a control to reduce the gear ratio of the mechanical transmission part is started. Specifically, the applying pressures or the releasing pressures of the frictional engagement devices such as the predetermined clutches and brakes are changed gradually. The oil pressure of the clutch is lowered to a target pressure (at the point of time t2) during the process of lowering the revolution frequency of the engine. At the same time, or about that time, the gear ratio of the mechanical transmission part and the speed change ratio of the continuously variable transmission part are lowered to the target value.

A resonance region starts from the subsequent period of time t3. However, at this moment, the oil pressure of the clutch is lowered, the individual speed change ratios are reduced, and the revolution frequency of the engine is lowered to the target value. For this reason, the resonance is not generated or dampened. When the resonance region is terminated by the change in the running condition or the like, or when the prediction of the resonance is dissatisfied (at the point of time t4), the revolution frequency of the engine is raised gradually by restoring the operating point thereof. During the restoration of the operating point of the engine, the oil pressure of the clutch is started to be raised at a point of time t5, and the gear ratio of the mechanical transmission part and the speed change ratio of the continuously variable transmission part are restored to the previous level. The control is terminated at the subsequent point of time t6. Thus, the transmitted torques and the revolution frequencies are changed also by the control shown in FIG. 9, the resonance is thereby prevented or dampened.

Figure 10:
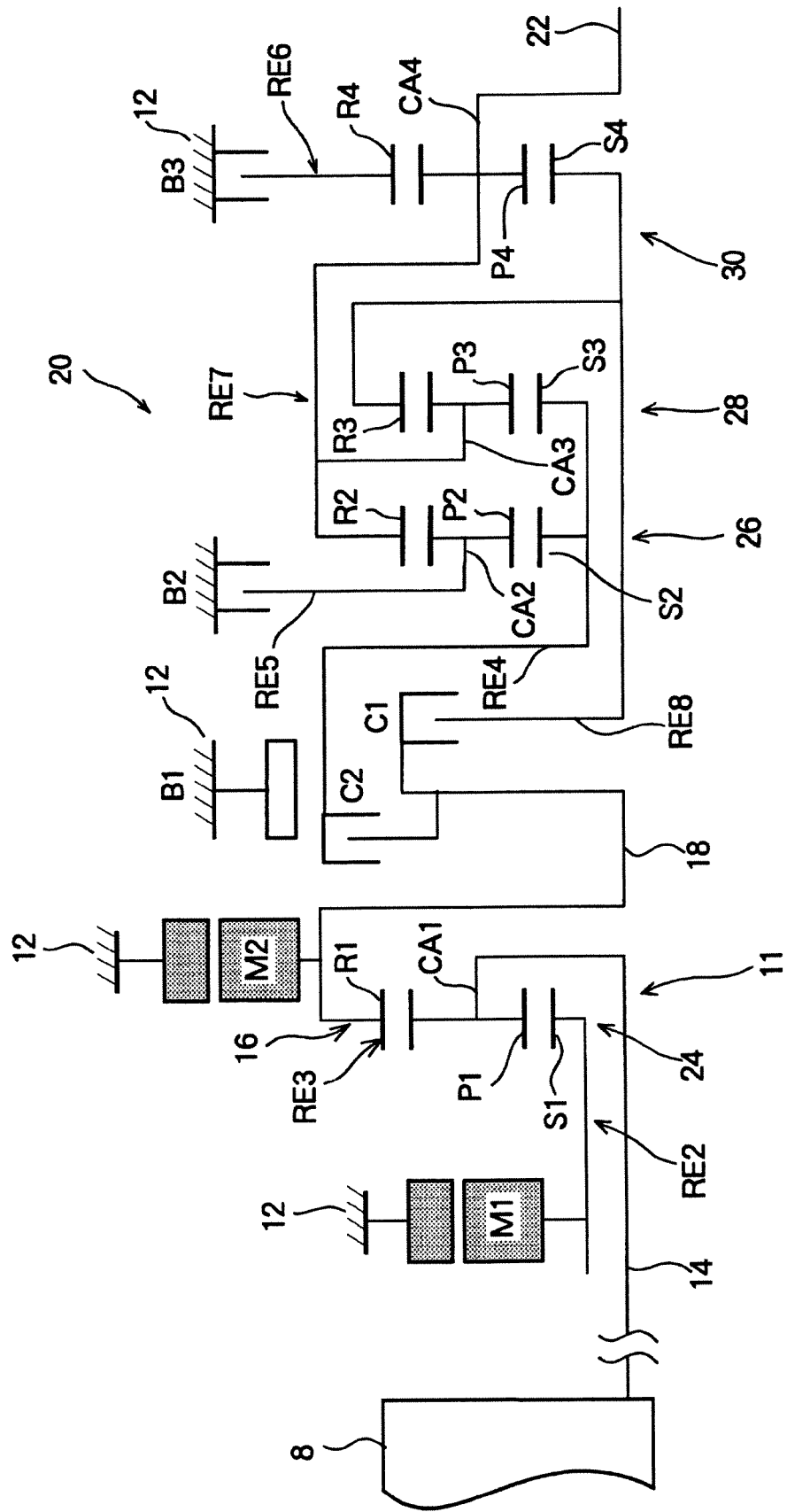
FIG. 10 is a skeleton diagram showing another example of a power transmission unit to which the invention is applied.

Additionally, the present invention can also be applied to power transmission units other than the one shown in FIG. 3. An example is shown in FIG. 10. In the example shown in FIG. 10, the lock-up clutch C0 and the speed increasing brake B0 of the power transmission unit shown in FIG. 3 are omitted. The reference numerals in common with those in FIG. 3 are allotted to the remaining elements in FIG. 10. Also, the control line shown in FIG. 3 is omitted in FIG. 10.

Figure 11:
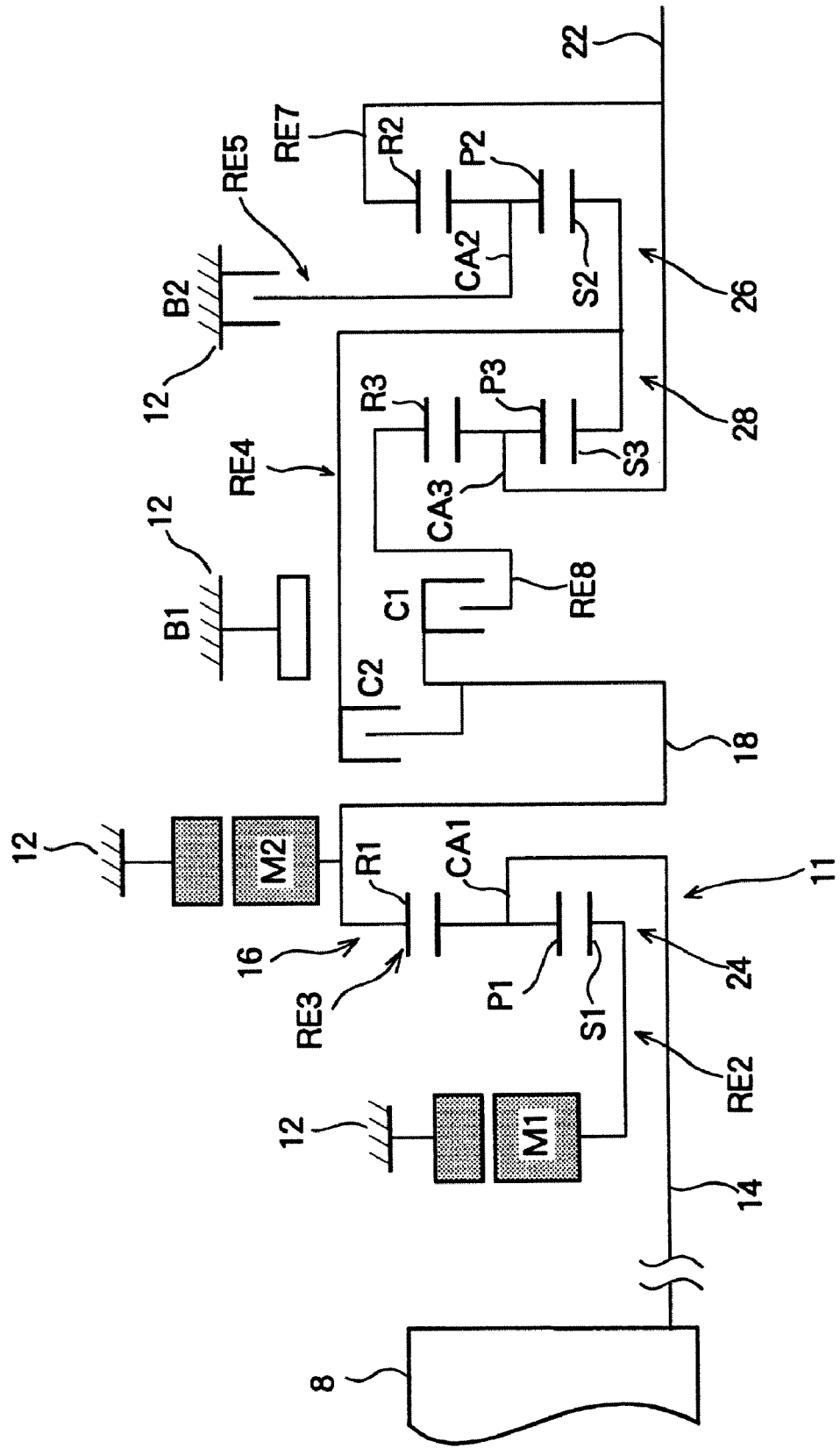
FIG. 11 is a skeleton diagram showing a further example of a power transmission unit to which the invention is applied.
Figure 12:
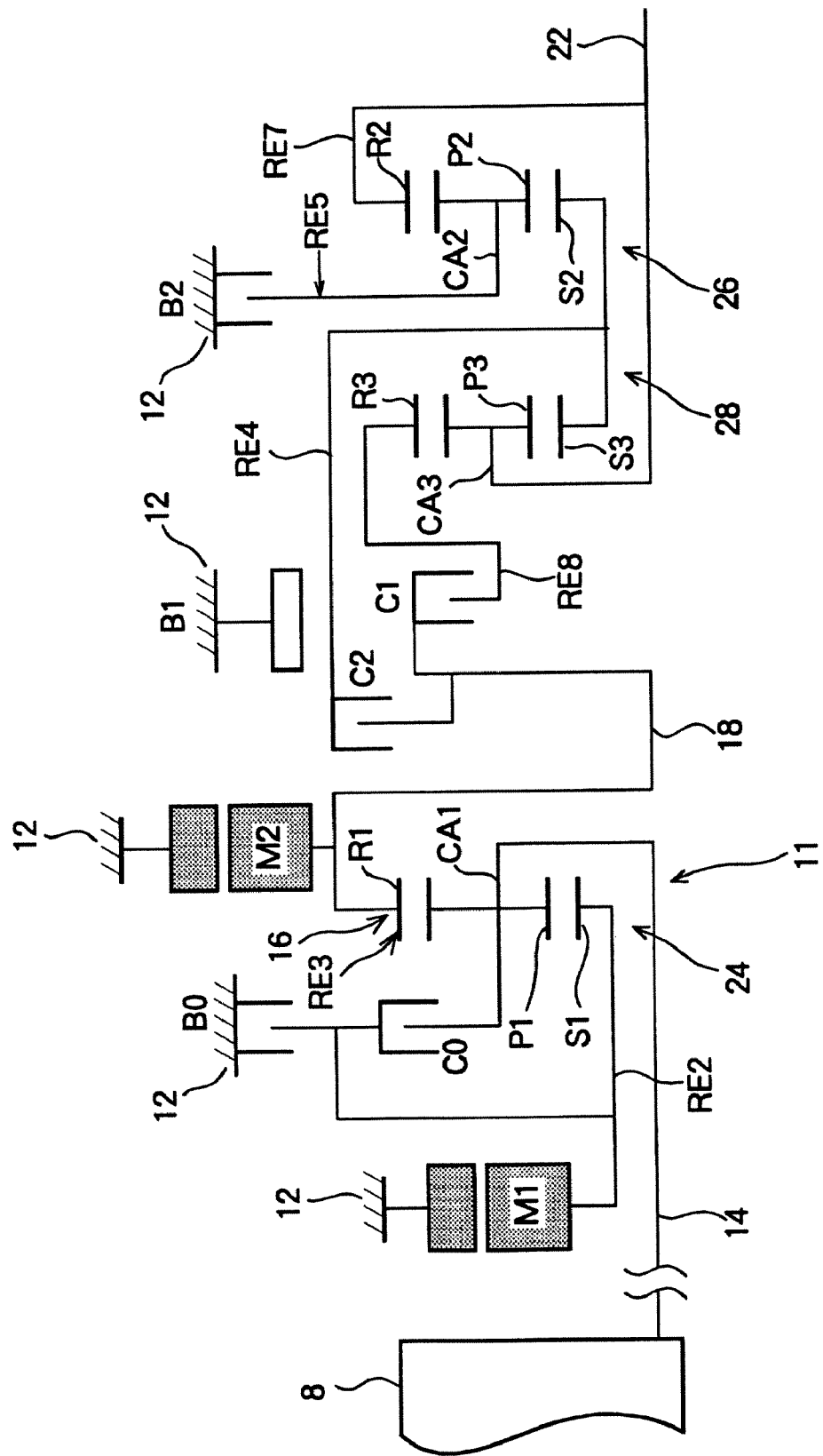
FIG. 12 is a skeleton diagram showing a still another example of a power transmission unit to which the invention is applied.

In an example shown in FIG. 11, the fourth planetary gear mechanism 30 of the power transmission unit shown in FIG. 10 is omitted, and the positions of the second and third planetary gear mechanisms 26 and 28 are switched. The reference numerals in common with those in FIGS. 3 and 10 are allotted to the remaining elements in FIG. 11. Further example is shown in FIG. 12. FIG. 12 shows the example in which the lock-up clutch C0 and the speed increasing brake B0 of FIG. 3 is added to the power transmission unit of FIG. 11. The reference numerals in common with those in FIGS. 3, 10 and 11 are allotted to the remaining elements in FIG. 12.

What is claimed is:

1. A control system for a power transmission unit of a vehicle transmitting power outputted from a prime mover, comprising:
   a resonance detecting/predicting device which detects or predicts a generation of a resonance of the power transmission unit resulting from a power transmission;
   a driving condition detecting device which detects a driving condition of a vehicle in case a generation of a resonance is detected or predicted by the resonance detecting/predicting device; and
   a resonance dampening control selecting device which selects a control for dampening the detected or predicted resonance on the basis of the driving condition of the vehicle detected by the driving condition detecting device; and
   at least a first resonance dampening control and a second resonance dampening control as the control which dampens a resonance,
   wherein the resonance dampening control selecting device includes a device which switches the resonance dampening control between the first resonance dampening control and the second resonance dampening control in accordance with the driving condition of the vehicle,
   wherein the driving condition is categorized into at least a first driving condition and a second driving condition, the power transmitting conditions thereof are different from each other, and
   wherein the resonance dampening control selecting device includes a device which selects the first resonance dampening control under the first driving condition, and selects the second resonance dampening control under the second driving condition.

2. The control system for a power transmission unit of a vehicle according to claim 1, wherein:
   the power transmission unit comprises a clutch mechanism which changes a transmission torque capacity thereof, and
   the first resonance dampening control includes a control which reduces the torque capacity of the clutch mechanism.

3. The control system for a power transmission unit of a vehicle according to claim 1, wherein:
   the first driving condition is a condition where the vehicle is driven by an external force, and
   the second driving condition is a condition where the vehicle is driven by the power outputted from the prime mover.

4. The control system for a power transmission unit of a vehicle according to claim 1, wherein:
   the prime mover includes an internal combustion engine which changes an operating point governed by an output torque and a revolution frequency or momentums corresponding to those factors;
   the power transmission unit includes at least any of a clutch mechanism, a transmission which varies a speed change ratio, and a differential mechanism which performs a differential action selectively among at least three elements; and
   the control which dampens a resonance is at least any of a control which reduces the torque capacity of the clutch mechanism, a control which changes the operating point of the internal combustion engine, a control which varies the speed change ratio, and a control which activates the differential mechanism in an inactive condition.

5. The control system for a power transmission unit of a vehicle according to claim 4, wherein:
the differential mechanism includes a single pinion type planetary gear mechanism, comprising;
a carrier, which functions as an input rotary element,
a sun gear, which functions as a reaction rotary element, and
a ring gear, which functions as an output rotary element.

6. The control system for a power transmission unit of a vehicle according to claim 4, wherein:
the differential mechanism includes a single pinion type planetary gear mechanism, comprising;
a carrier as a first rotary element,
a sun gear as a second rotary element, and
a ring gear as a third rotary element.

7. The control system for a power transmission unit of a vehicle according to claim 1, wherein:
the power transmission unit comprises
an electrical transmission part, in which a ratio between revolution frequencies of an input side and an output side is varied continuously by electrically controlling a torque to be established or absorbed; and
a mechanical transmission part, in which a ratio between the revolution frequencies of the input side and the output side is varied by changing a transmission route of the torque.

8. The control system for a power transmission unit of a vehicle according to claim 7, wherein:
the mechanical transmission part comprises three sets of planetary gear mechanisms and a plurality of clutch mechanisms.

9. The control system for a power transmission unit of a vehicle according to claim 8, wherein:
the individual planetary gear mechanisms includes a single pinion type planetary gear mechanism;
sun gears of a first and a second planetary gear mechanisms are connected with each other;
a ring gear of the first planetary gear mechanism, a carrier of the second planetary gear mechanism and a carrier of a third planetary gear mechanism are connected to one another, while connected with an output member;
a ring gear of the second planetary gear mechanism and a sun gear of the third planetary gear mechanism are connected with each other; and
the clutch mechanism includes
a first clutch which selectively connects the ring gear of the second planetary gear mechanism and the sun gear of the third planetary gear mechanism with the electrical transmission part;
a second clutch which selectively connects the sun gears of the first and the second planetary gear mechanisms with the electrical transmission part;
a first brake which selectively fixes the sun gears of the first and the second planetary gear mechanisms;
a second brake which selectively fixes the carrier of the first planetary gear mechanism; and
a third brake which selectively fixes the ring gear of the third planetary gear mechanism.

10. The control system for a power transmission unit of a vehicle according to claim 7, wherein:
the mechanical transmission part comprises two sets of planetary gear mechanisms and a plurality of clutch mechanisms.

11. The control system for a power transmission unit of a vehicle according to claim 10, wherein:
the planetary gear mechanism includes a single pinion type planetary gear mechanism;
sun gears of a first and a second planetary gear mechanisms are connected with each other;
a carrier of the first planetary gear mechanism and a ring gear of the second planetary gear mechanism are connected with each other, while connected with an output member; and
the clutch mechanism includes
a first clutch which selectively connects the ring gear of the first planetary gear mechanism with the electrical transmission part;
a second clutch which selectively connects the sun gears of the first and the second planetary gear mechanisms with the electrical transmission part;
a first brake which selectively fixes the sun gears of the first and the second planetary gear mechanisms; and
a second brake which selectively fixes the carrier of the second planetary gear mechanism.

12. The control system for a power transmission unit of a vehicle according to claim 7, wherein:
the electrical transmission part comprises
a planetary gear mechanism including a first rotary element to which an internal combustion engine is connected, a second rotary element to which a first motor generator is connected, and a third rotary element which is connected to the mechanical transmission part, and
a second motor generator which is connected to the third rotary element; and
a speed of the internal combustion engine is varied by the first motor generator.

13. The control system for a power transmission unit of a vehicle according to claim 12, further comprising:
a clutch mechanism which selectively connects any two rotary elements of the first to third rotary elements; and
a brake mechanism which selectively connects the second rotary element.

14. The control system for a power transmission unit of a vehicle according to claim 13, wherein:
the planetary gear mechanism includes a single pinion type planetary gear mechanism including a sun gear, a ring gear, and a carrier holding a pinion gear meshing with the sun gear and the ring gear; and
the carrier is connected to the internal combustion engine, the sun gear is connected to the first motor generator, and the ring gear is connected to the mechanical transmission part.

15. The control system for a power transmission unit of a vehicle according to claim 14, wherein:
the clutch mechanism includes a first engagement device which selectively connects the carrier and the sun gear, and
the brake mechanism includes a second engagement device which selectively fixes the sun gear.

16. The control system for a power transmission unit of a vehicle according to claim 12, wherein:
the electrical transmission part further comprises at least any of
a clutch mechanism which selectively connects any two rotary elements of the first to third rotary elements; and
a brake mechanism which selectively connects the second rotary element, and
the electrical transmission part inactivates a differential action of the differential mechanism by applying the clutch mechanism, and fixes the differential ratio of the differential mechanism by applying the brake mechanism.

17. The control system for a power transmission unit of a vehicle according to claim 7, wherein:

the electrical transmission part comprises a differential mechanism including a first rotary element to which a power of an internal combustion engine is inputted, a second rotary element to which a power of a first motor generator is inputted, and a third rotary element which outputs the power to the output side, and the electrical transmission part varies the power of the internal combustion engine continuously by controlling the revolution frequency of the first motor generator.

18. The control system for a power transmission unit of a vehicle according to claim 1, wherein:

the prime mover includes an internal combustion engine which changes an operating point governed by an output torque and a revolution frequency or momentums corresponding to those factors;

the power transmission unit includes at least any of a clutch mechanism, a transmission which varies a speed change ratio, and a differential mechanism which performs a differential action selectively or continuously among at least three elements including the internal combustion engine, an electric motor, and an output shaft; and the control which dampens a resonance is at least any of a control which reduces the torque capacity of the clutch mechanism, a control which changes the operating point of the internal combustion engine, a control which varies the speed change ratio, and a control which allows a fixed differential ratio of the differential mechanism to vary continuously.

19. A control system for a power transmission unit of a vehicle transmitting power outputted from a prime mover, comprising:

a resonance detecting/predicting device which detects or predicts a generation of a resonance of the power transmission unit resulting from the power transmission; and a resonance dampening control device, which performs a plurality of resonance dampening controls which dampens the resonance detected or predicted by the resonance detecting/predicting device in order of priority, wherein the power transmission unit comprises a clutch mechanism which changes a transmission torque capacity thereof, and the resonance dampening control device includes a device which performs a control of reducing the torque capacity of the clutch mechanism as a priority resonance dampening control by releasing the clutch mechanism if the clutch mechanism is fully engaged.

20. The control system for a power transmission unit of a vehicle according to claim 19, wherein:

the prime mover includes an internal combustion engine which changes an operating point governed by an output torque and a revolution frequency or momentums corresponding to those factors;

the power transmission unit includes at least any of a clutch mechanism, a transmission which varies a speed change ratio, and a differential mechanism which performs a differential action selectively among at least three elements; and the control which dampens a resonance is at least any of a control which reduces the torque capacity of the clutch mechanism, a control which changes an operating point of the internal combustion engine, a control which varies the speed change ratio, and a control which activates the differential mechanism in an inactive condition.

21. The control system for a power transmission unit of a vehicle according to claim 20, wherein:

the differential mechanism includes a single pinion type planetary gear mechanism, comprising a carrier, which functions as an input rotary element;
a sun gear, which functions as a reaction rotary element; and
a ring gear, which functions as an output rotary element.

22. The control system for a power transmission unit of a vehicle according to claim 20, wherein:

the differential mechanism includes a single pinion type planetary gear mechanism, comprising
a carrier as a first rotary element;
a sun gear as a second rotary element; and
a ring gear as a third rotary element.

23. The control system for a power transmission unit of a vehicle according to claim 19, wherein:

the power transmission unit comprises
an electrical transmission part, in which a ratio between revolution frequencies of an input side and an output side is varied continuously by electrically controlling a torque to be established or absorbed; and
a mechanical transmission part, in which a ratio between the revolution frequencies of the input side and the output side is varied by changing a transmission route of the torque.

24. The control system for a power transmission unit of a vehicle according to claim 23, wherein:

the mechanical transmission part comprises three sets of planetary gear mechanisms and a plurality of clutch mechanisms.

25. The control system for a power transmission unit of a vehicle according to claim 24, wherein:

the planetary gear mechanism includes a single pinion type planetary gear mechanism;

sun gears of a first and a second planetary gear mechanisms are connected with each other;

a ring gear of the first planetary gear mechanism, a carrier of the second planetary gear mechanism and a carrier of a third planetary gear mechanism are connected to one another, while connected with an output member;

a ring gear of the second planetary gear mechanism and a sun gear of the third planetary gear mechanism are connected with each other; and the clutch mechanism includes
a first clutch which selectively connects the ring gear of the second planetary gear mechanism and the sun gear of the third planetary gear mechanism with the electrical transmission part;
a second clutch which selectively connects the sun gears of the first and the second planetary gear mechanisms with the electrical transmission part;
a first brake which selectively fixes the sun gears of the first and the second planetary gear mechanisms;
a second brake which selectively fixes the carrier of the first planetary gear mechanism; and
a third brake which selectively fixes the ring gear of the third planetary gear mechanism.

26. The control system for a power transmission unit of a vehicle according to claim 23, wherein:

the mechanical transmission part comprises two sets of planetary gear mechanisms and a plurality of clutch mechanisms.

27. The control system for a power transmission unit of a vehicle according to claim 26, wherein:

the planetary gear mechanism includes a single pinion type planetary gear mechanism;

sun gears of a first and a second planetary gear mechanisms are connected with each other;

a carrier of the first planetary gear mechanism and a ring gear of the second planetary gear mechanism are connected with each other, while connected with an output member; an the clutch mechanism includes a first clutch which selectively connects the ring gear of the first planetary gear mechanism with the electrical transmission part;

a second clutch which selectively connects the sun gears of the first and the second planetary gear mechanisms with the electrical transmission part;

a first brake which selectively fixes the sun gears of the first and the second planetary gear mechanisms; and a second brake which selectively fixes the carrier of the second planetary gear mechanism.

28. The control system for a power transmission unit of a vehicle according to claim 23, wherein:

the electrical transmission part comprises a planetary gear mechanism including a first rotary element to which an internal combustion engine is connected, a second rotary element to which a first motor generator is connected, and a third rotary element which is connected to the mechanical transmission part, and a second motor generator which is connected to the third rotary element; and a speed of the internal combustion engine is varied by the first motor generator.

29. The control system for a power transmission unit of a vehicle according to claim 28, further comprising:

a clutch mechanism for which selectively connects any two rotary elements of the first to third rotary elements; and a brake mechanism for which selectively connects the second rotary element.

30. The control system for a power transmission unit of a vehicle according to claim 29, wherein:

the planetary gear mechanism includes a single pinion type planetary gear mechanism including a sun gear, a ring gear, and a carrier which holds a pinion gear which meshes with the sun gear and the ring gear; and the carrier is connected to the internal combustion engine, the sun gear is connected to the first motor generator, and the ring gear is connected to the mechanical transmission part.

31. The control system for a power transmission unit of a vehicle according to claim 29, wherein:

the clutch mechanism includes a first engagement device which selectively connects the sun gear and the carrier, and the brake mechanism includes a second engagement device which selectively fixes the sun gear.

32. The control system for a power transmission unit of a vehicle according to claim 28, wherein:

the electrical transmission part further comprises at least any of a clutch mechanism which selectively connects any two rotary elements of the first to third rotary elements; and a brake mechanism which selectively connects the second rotary element, and the electrical transmission part inactivates a differential action of the differential mechanism by applying the clutch mechanism, and fixes the differential ratio of the differential mechanism by applying the brake mechanism.

33. The control system for a power transmission unit of a vehicle according to claim 23, wherein:

the electrical transmission part comprises a differential mechanism including a first rotary element to which a power of an internal combustion engine is inputted, a second rotary element to which a power of a first motor generator is inputted, and a third rotary element which output the power to the output side, and the electrical transmission part varies the power of the internal combustion engine continuously by controlling the revolution frequency of the first motor generator.

34. The control system for a power transmission unit of a vehicle according to claim 19, wherein:

the prime mover includes an internal combustion engine which changes an operating point governed by an output torque and a revolution frequency or momentums corresponding to those factors;

the power transmission unit includes at least any of a clutch mechanism, a transmission which varies a speed change ratio, and a differential mechanism which performs a differential action selectively or continuously among at least three elements including the internal combustion engine, an electric motor, and an output shaft; and the control which dampens a resonance is at least any of a control which reduces the torque capacity of the clutch mechanism, a control which changes the operating point of the internal combustion engine, a control which varies the speed change ratio, and a control which allows a fixed differential ratio of the differential mechanism to vary continuously.

35. The control system for a power transmission unit of a vehicle according to claim 19, wherein:

the clutch mechanism is released halfway.

36. A control method for a power transmission unit of a vehicle transmitting power outputted from a prime mover, comprising:

detecting or predicting a generation of a resonance of the power transmission unit resulting from a power transmission;

detecting a driving condition of a vehicle in case a generation of a resonance is detected or predicted at the step of detecting or predicting a generation of a resonance; and selecting a control for dampening the detected or predicted resonance on the basis of the driving condition of the vehicle detected at the step of detecting a driving condition, wherein the detected driving condition is categorized into at least a first driving condition and a second driving condition, the first and second driving conditions are different from each other, and wherein a first resonance dampening control is selected when the first driving condition is detected and a second resonance damping control is selected when the second driving condition is detected.

37. A control method for a power transmission unit of a vehicle transmitting power outputted from a prime mover, comprising:

detecting or predicting a generation of a resonance of the power transmission unit resulting from the power transmission; and carrying out a plurality of resonance dampening controls which dampens the resonance detected or predicted at the step of detecting or predicting a generation of a resonance in order of priority, wherein the plurality of resonance dampening controls includes a priority resonance dampening control, and the priority resonance dampening control reduces torque capacity of a clutch mechanism by releasing the clutch mechanism if the clutch mechanism is fully engaged.

* * * * *